US012456846B2

(12) United States Patent
Benn et al.

(10) Patent No.: US 12,456,846 B2
(45) Date of Patent: Oct. 28, 2025

(54) CLAMP ASSEMBLY FOR RF COMPRESSION CONNECTOR

(71) Applicant: John Mezzalingua Associates, LLC, Liverpool, NY (US)

(72) Inventors: Jeremy Benn, Liverpool, NY (US); Shawn Chawgo, Phoenix, NY (US); Christopher Natoli, Baldwinsville, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 521 days.

(21) Appl. No.: 17/781,633

(22) PCT Filed: Jan. 14, 2021

(86) PCT No.: PCT/US2021/013399

§ 371 (c)(1),
(2) Date: Jun. 1, 2022

(87) PCT Pub. No.: WO2021/146395

PCT Pub. Date: Jul. 22, 2021

(65) Prior Publication Data

US 2023/0043957 A1 Feb. 9, 2023

Related U.S. Application Data

(60) Provisional application No. 62/960,941, filed on Jan. 14, 2020.

(51) Int. Cl.

| | |
|---|---|
| ***H01R 24/40*** | (2011.01) |
| ***H01R 9/05*** | (2006.01) |
| *H01R 103/00* | (2006.01) |

(52) U.S. Cl.
CPC .......... *H01R 24/40* (2013.01); *H01R 9/0524* (2013.01); *H01R 2103/00* (2013.01)

(58) Field of Classification Search
CPC .... H01R 9/0515; H01R 9/0524; H01R 24/38; H01R 24/40; H01R 2103/00; H01R 13/58;
(Continued)

(56) References Cited

U.S. PATENT DOCUMENTS 5,722,855 A * 3/1998 Kanda .................. H01R 24/566 439/429
6,089,912 A * 7/2000 Tallis .................. H01R 24/542 439/583
(Continued)

FOREIGN PATENT DOCUMENTS

EP 0986135 A1 3/2000
FR 2877501 A1 5/2006
WO WO-2013071204 A1 * 5/2013 .......... H01R 13/625

OTHER PUBLICATIONS

Korean Intellectual Property Office (KIPO) as ISA/KR, International Search Report and Written Opinion from International Appl. No. PCT/US2021/013399, mailed May 12, 2021 (total 13 pgs.).
(Continued)

*Primary Examiner* — Abdullah A Riyami
*Assistant Examiner* — Amara Anderson
(74) *Attorney, Agent, or Firm* — Barclay Damon LLP

(57) ABSTRACT

An RF compression connector includes a simplified clamp mechanism having a common clamp base, and a plurality of segments disposed on the common clamp base wherein the segments include alternating first and second retention members disposed along the circumference of the clamp, wherein each of the first retention members has an outwardly projecting shoulder to engage a connector body and each of the second retention members includes an inwardly projecting
(Continued)

shoulder to engage an outer jacket of a coaxial cable connector. The first and second retention members of the clamp mechanism inhibit separation of the connector body relative to the coaxial cable.

19 Claims, 6 Drawing Sheets

(58) Field of Classification Search
CPC ............ H01R 13/5804; H01R 13/5816; H01R 13/5205; H01R 13/5221; H01R 24/56; H01R 24/564
USPC .......................................................... 439/578
See application file for complete search history.

(56) References Cited

U.S. PATENT DOCUMENTS 6,916,205 B1 7/2005 Kaneko
7,288,002 B2 10/2007 Rodrigues et al.
2008/0261445 A1 10/2008 Malloy et al.
2012/0184135 A1 7/2012 Paynter et al.
2012/0252265 A1 10/2012 Wild et al.
2013/0178096 A1 7/2013 Matzen
2014/0235099 A1* 8/2014 Burris ................ H01R 13/6581 439/578

OTHER PUBLICATIONS

Korean Intellectual Property Office (KIPO) as ISA/KR , International Preliminary Report on Patentability from International Appl. No. PCT/US2021/013399, mailed Feb. 9, 2022 (total 14 pgs.).
European Patent Office; Extended European Search Report; Application No. 21741729.4; Dated: Mar. 22, 2024; 13 pages.

* cited by examiner

CLAMP ASSEMBLY FOR RF COMPRESSION CONNECTOR

CROSS-REFERENCE TO RELATED APPLICATIONS

This application claims priority under relevant portions of 35 U.S.C. § 119 to U.S. Patent Application 62/960,941, filed Jan. 14, 2020, under relevant portions of 35 U.S.C. § 111 and 37 C.F.R. § 1.51 and 1.53, the entire contents of which is hereby incorporated by reference.

TECHNICAL FIELD

The present invention relates to wireless communications, and more particularly, to highly reliable compression connectors for RF cables.

BACKGROUND

Conventional RF compression connectors include complicated internal clamping mechanisms that enable a connector to be installed in combination with an RF cable in the field. The design of these connectors is driven by the need to perform robust compression of the inner and outer conductors of the RF cable with the connector inner conductor and conductor body, respectively. This is typically performed by a technician using a handheld compression gun.

An alternative to having the compression connector installed in the field is to complete the assembly in a controlled work environment, i.e., a factory setting. An advantage to performing assembly in a factory setting relates to the ability to accurately measure the length and produce a cable having the requisite size. However, a variety of issues add complexity and reduce efficiency during field installation, hence, there still exist opportunities for improvement.

Consequently, a need exists for a compression RF connector that has a simplified clamp mechanism that is lower in complexity yet results in a highly reliable and robust RF connection.

SUMMARY OF THE INVENTION

In one embodiment, the disclosure provides a compression RF connector comprising: a connector body, a coaxial cable having inner and outer conductors for transmission of RF signals, and a clamp assembly configured to produce a conductive connection for grounding the outer conductor to the connector body while maintaining a robust mechanical connection between the coaxial cable and the connector body. The clamp assembly includes first and second arcuate segments assembled to circumscribe a terminal end of the coaxial cable and configured to urge the outer conductor into electrical contact with the connector body to facilitate connector grounding. Furthermore, upon assembly, the first and second arcuate segments define a common clamp base, at least one outer barb projects radially outwardly from one of the plurality of arcuate segments and at least one inner barb member projects radially inwardly from one of the plurality of segments. At least one outer and inner barb member of the clamp assembly inhibits separation of the connector body relative to the coaxial cable.

In another embodiment, the disclosure describes a connector for use in combination with a coaxial cable, the connector comprising a connector body and a clamp assembly configured to connect the connector body to the coaxial cable. The clamp assembly comprises (i) first and second arcuate segments assembled to circumscribe a terminal end of the coaxial cable, (ii) a first end configured to urge the outer conductor into electrical contact with the connector body, and (iii) a second end defining a plurality of retention members projecting radially from each of the the first and second arcuate segments. At least one of the plurality of retention members projects radially outwardly to engage an inner surface of the connector body. Furthermore, at least another of the plurality of retention members projects radially inwardly to engage an outer surface of the coaxial cable. The plurality of retention members inhibit separation of the connector body relative to the coaxial cable.

DESCRIPTION OF EXEMPLARY EMBODIMENTS

Figure 1:
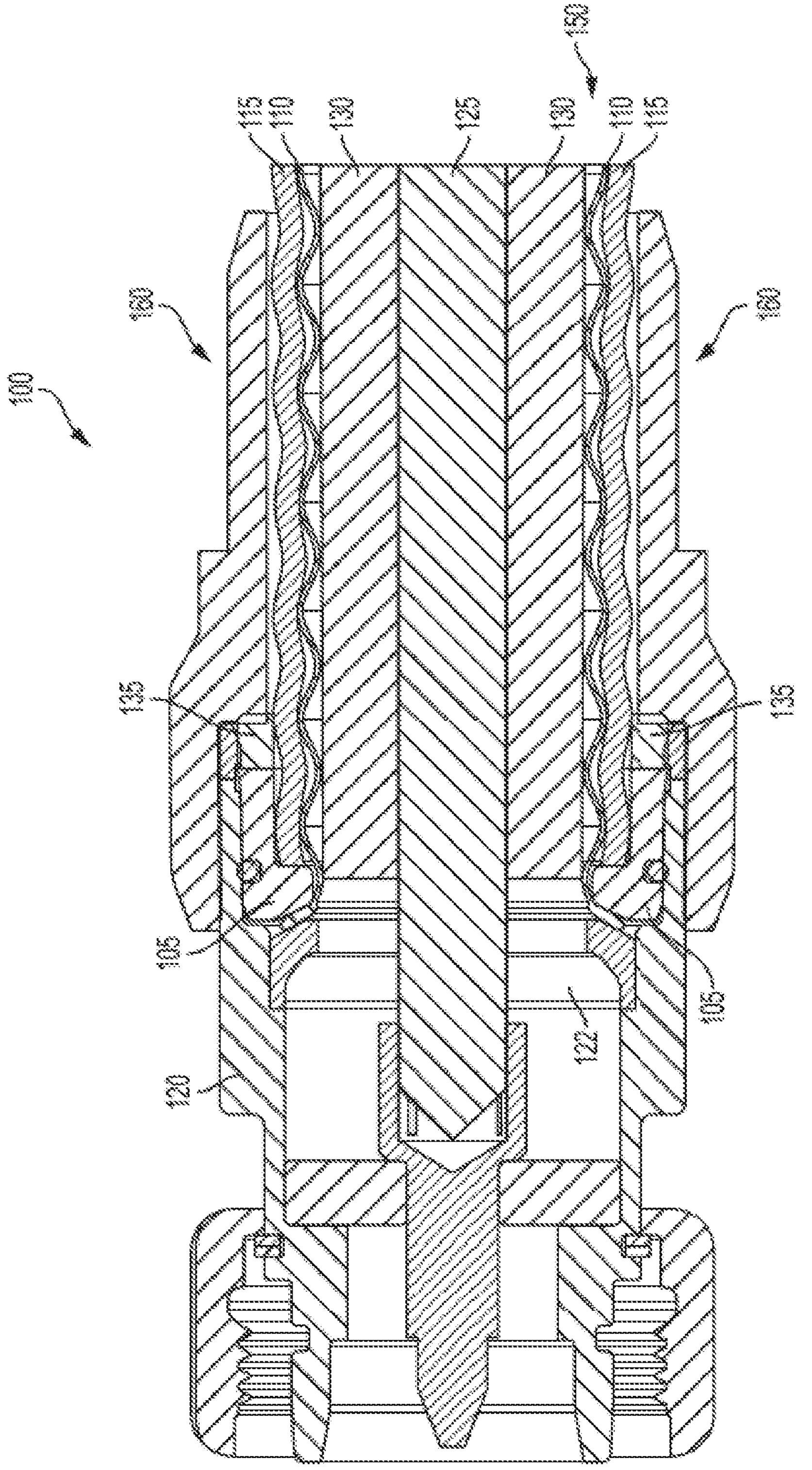
FIG. 1 is a sectional view of an exemplary compression connector according to the present disclosure.

FIG. 1 illustrates an exemplary RF compression connector 100 according to the disclosure, as installed on an annular coaxial cable 150. The coaxial cable 150 includes an inner conductor 125, concentrically surrounded by an insulator or dielectric core 130; an outer conductor 110; and a cable jacket 115 disposed over the outer surface of the outer conductor 110. The coaxial cable connector 100 includes a split clamp assembly 105, which is disposed within a connector body 120; and between one end of the coaxial cable 150 and a contact cone 122. More specifically, the split clamp assembly 105 is configured to form (i) an inwardly projecting conical flange at a first or forward end 106 and (ii) first and second retention members, barbs or retention shoulders B1, B2 projecting radially from a second or aft end 108 of the clamp assembly 105. Hereinafter, these terms will be used interchangeably to describe the retention means between the clamp assembly 100 and the connector body 120 and the coaxial cable 150.

In the described embodiment, a molded thermoplastic strain relief member 160 may be disposed over the coaxial cable 150 and the connector body 120. Furthermore, an O-ring seal 135 may be compressed between the cable jacket 115, strain relief member 160, split clamp assembly 105 and the connector body 120. The coaxial cable 150 may be a ½ inch diameter annular RF cable, although other coaxial cable dimensions are possible and within the scope of the disclosure.

The first and second retention members B1, B2 of the split clamp assembly 105 mechanically engage both the connector body 120 and cable jacket 115 of the coaxial cable 150. More specifically, the first and second retention members B1, B2 alternate about the circumference of the split clamp assembly 105. That is, a first retention member B1 may projects outwardly over a first portion of one of the clamp assembly 105. For example, the first retention member B1 may be disposed in a first and third arcuate segment of the clamp assembly circumference, e.g., between about 0 and 90 degrees and about 180 and 270 degrees of the clamp assembly circumference. The retention member B2 may project inwardly over second and fourth segment of the clamp assembly circumference, e.g., between about 90 and 180 degrees and about 270 and 360 degrees of the clamp assembly circumference.

Figure 1A:
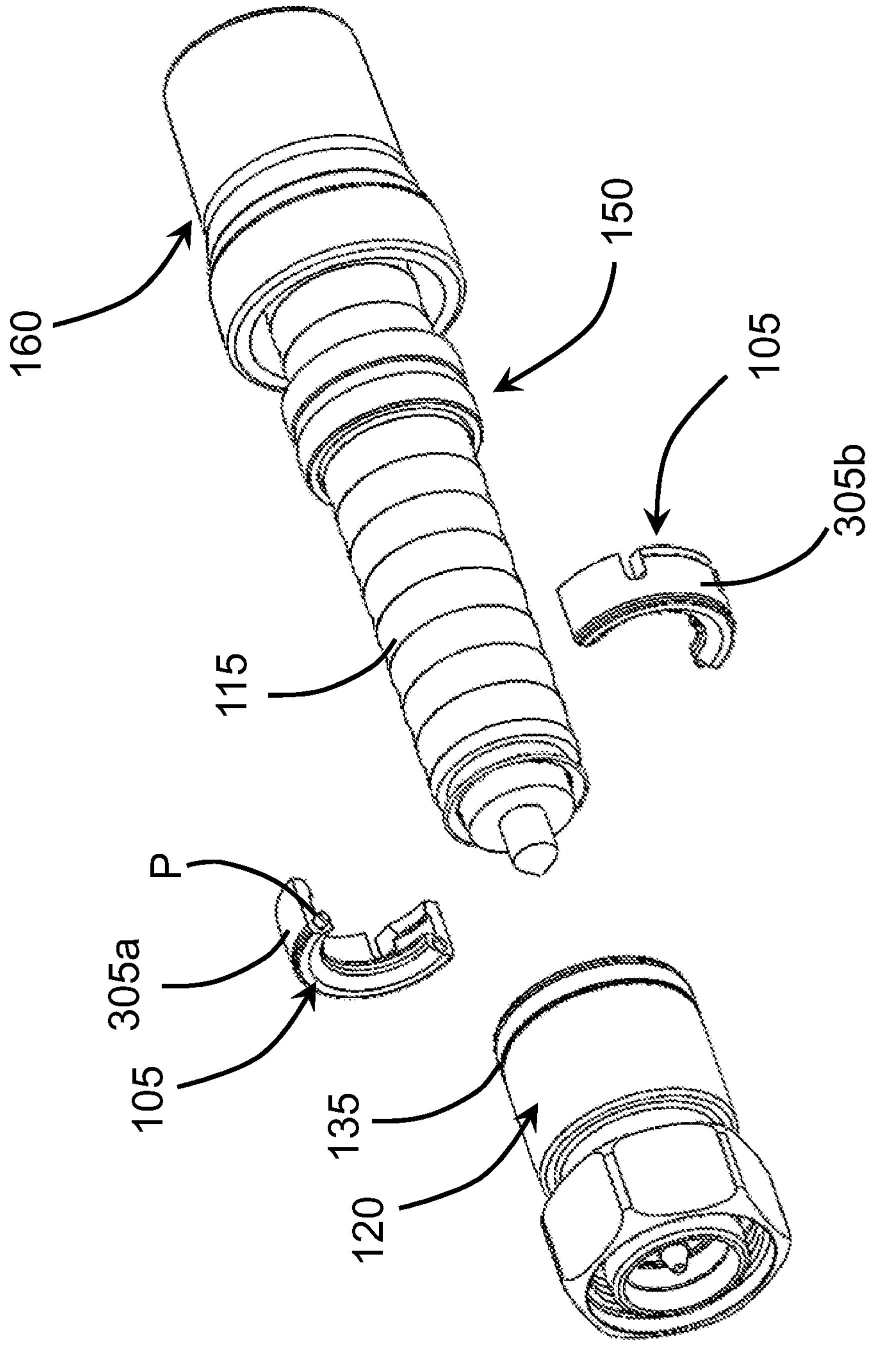
FIG. 1A is an exploded view of the compression connector including a connector body, a coaxial cable and a split clamp disposed between the connector body and coaxial cable.
Figure 2B:
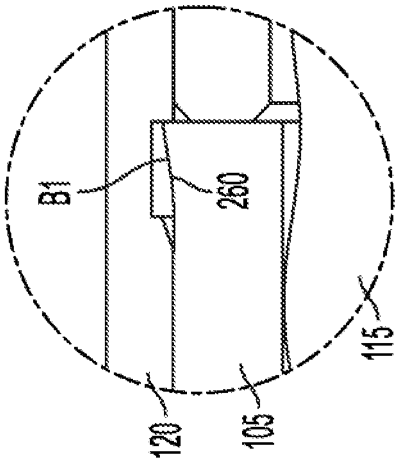
FIG. 2B is an enlarged view of portion 2B of FIG. 2A.
Figure 2A:
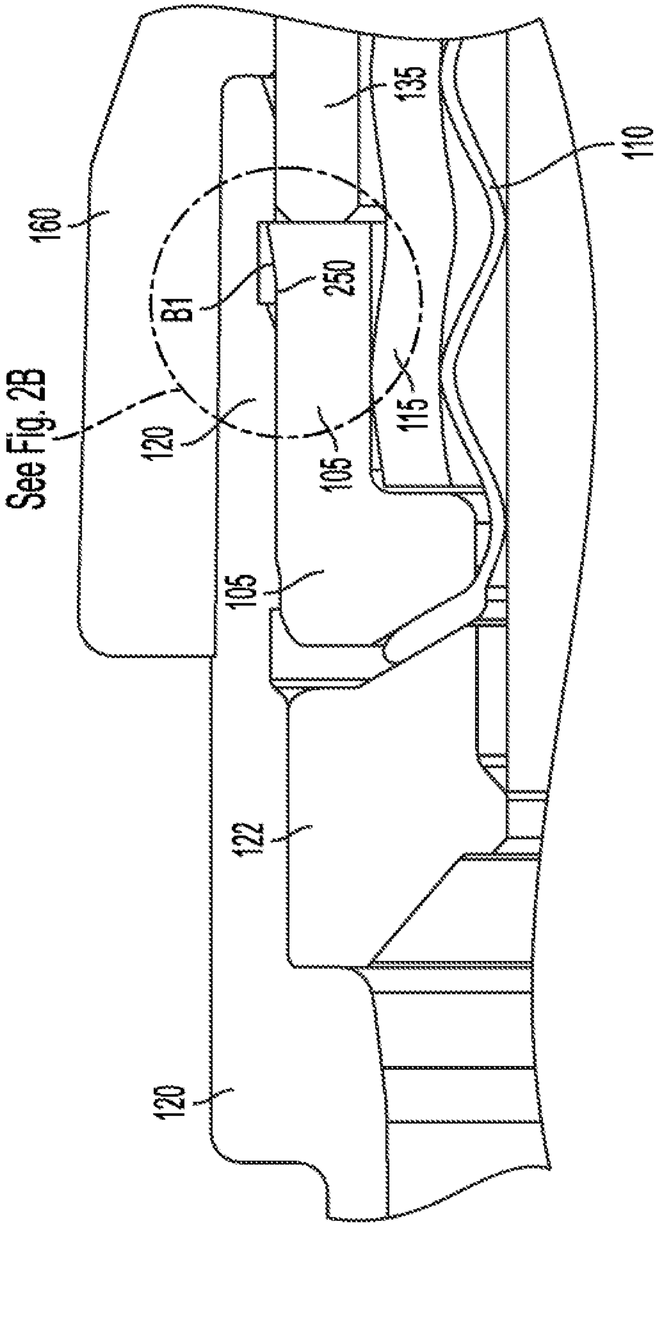
FIG. 2A is a sectional view taken substantially across one portion of the split clamp to view the engagement of an outer barb with the connector body.
Figure 2D:
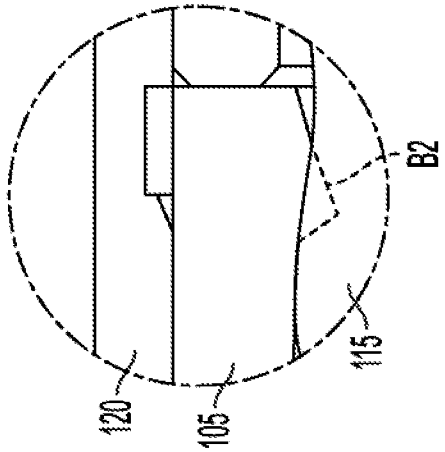
FIG. 2D is an enlarged view of portion 2D of FIG. 2C.

In FIGS. 1-2D, the retention members B1, B2 of the clamp assembly 105 mechanically engage the outer conductor 110, cable jacket 115, connector body 120, and O-ring seal 135. More specifically, the clamp assembly 105 is split in two arcuate segments 305*a*, 305*b* and joined via stub pins P (see FIGS. 1A and 3A) to clamp over the outer surface of the cable jacket 115. The end portion or terminal end of the outer conductor 110 is compressed between the an inwardly projecting flange 106 of the clamp assembly 105 (i.e., at a first or forward end of the clamp assembly 105) and a contact cone 122 disposed in combination with the inner surface of the connector 100. At least one of either the clamp assembly 105 and/or the contact cone 122 is conductive to facilitate grounding of the outer conductor 110 of the coaxial cable 150. That is, a grounding current may pass from the outer conductor 110 into the conductive clamp assembly 105, to the connector body 120 and, finally, to an interface port (not shown). Alternatively, a grounding current may flow from the outer conductor 110, to the conical cone 122, to the connector body 120 and into the interface port.

In FIGS. 2A and 2B, the outwardly projecting retention member B1 engages a counter bore 250 formed along the inner surface of connector body 120. The split clamp assembly 105 is press fit over the coaxial cable 150 such that the outer retention member B1 engages the counter bore 250, thereby preventing reverse translation of the connector body 120 relative to the coaxial cable 150. That is, the outwardly projecting retention member B1 inhibits the separation of the connector body 120 from the coaxial cable 150.

Figure 2C:
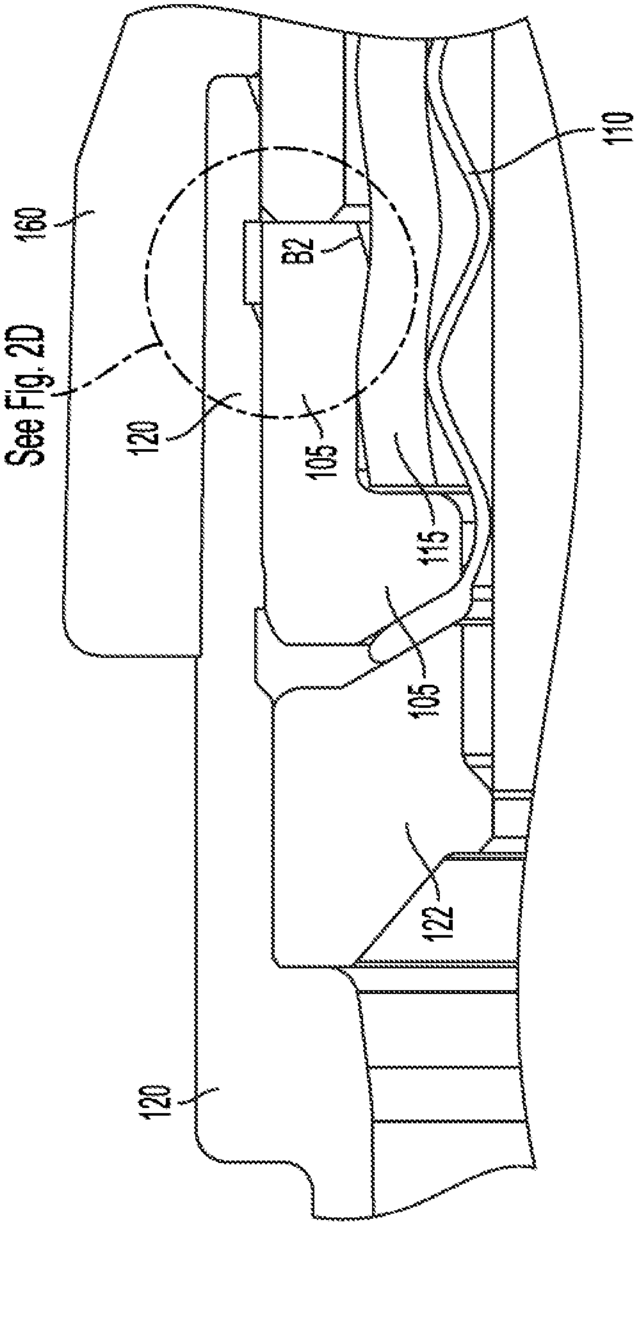
FIG. 2C is a sectional view taken substantially across another portion of the split clamp to view the engagement of an inner barb with an inner jacket of the coaxial cable.

Whereas a first cross sectional view is depicted in FIGS. 2A and 2B and is taken between a first and third arcuate section of the clamp assembly circumference, FIGS. 2C and 2D depict a second cross-sectional view taken about ninety degrees (90°) from the first cross sectional view or taken through a second and fourth arcuate section of the clamp assembly circumference. Therein, the inwardly projecting retention member B2 engages the outer jacket 115 of the coaxial cable 150 to, once again, prevent reverse translation of the connector body 120 relative to the coaxial cable 150.

Figure 3:
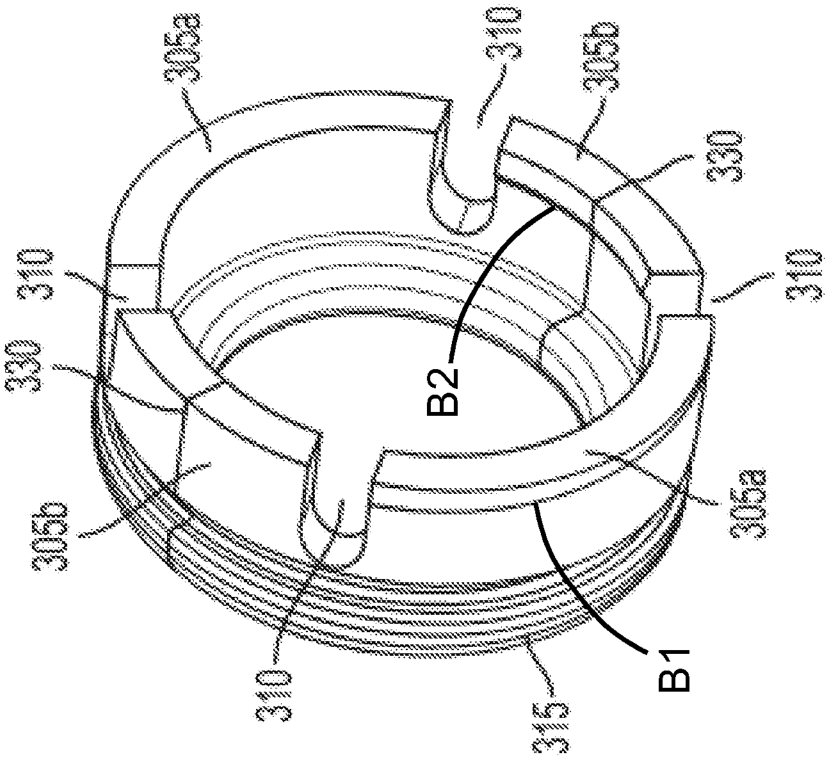
FIG. 3 illustrates an isolated perspective view of an assembled split clamp according to the present disclosure.
Figure 3A:
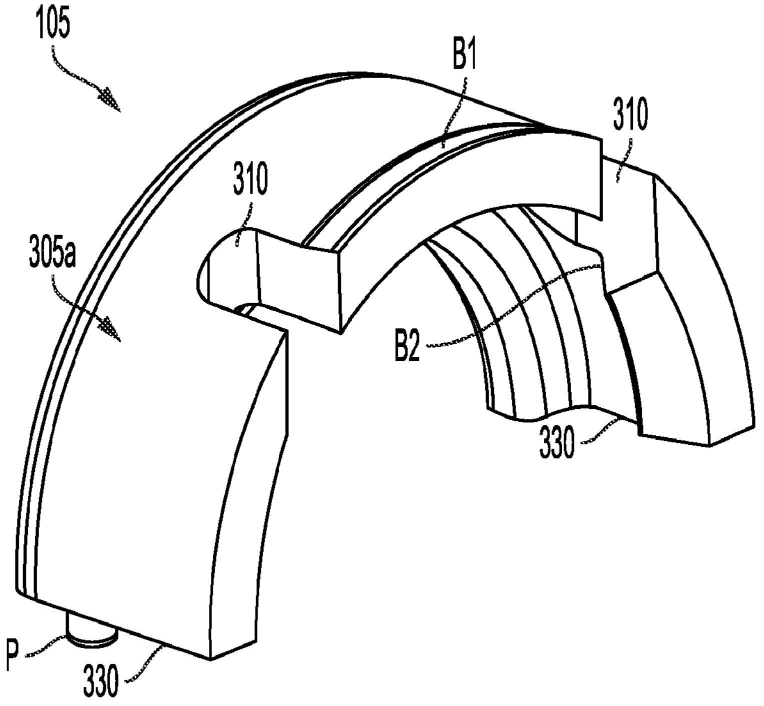
FIG. 3A is an isolated perspective view of a single segment of the split clamp assembly according to the present disclosure.

In FIG. 3, an isolated perspective view of an assembled split clamp assembly 105 includes at least two arcuate segments 305*a* and 305*b*. FIG. 3A, on the other hand, depicts an isolated perspective view of a single one of the arcuate segments 305*a*, 305*b*. As illustrated, the two arcuate segments 305*a* and 305*b* are joined along a plane 330 where a pair of stub pins P, each oriented orthogonally relative to the plane 330, are integrally molded with each of the segments 305*a*, 305*b*. Each stub pin P engages an aperture (not shown) formed in a mating portion of the adjacent arcuate segment 305*a* or 305*b*. Each of the arcuate segments 305*a*. 305*b* may be slotted to reduce the radial stiffness of each segment, thus allowing a small degree of flexibility. In the illustrated embodiment, the clamp assembly 105 defines four slots 310, i.e., parallel to the longitudinal axis of the coaxial cable 150, which divide the clamp assembly 105 into the plurality of flexible arcuate segments. The slots 310 enable a small degree of radial displacement such that each of the first and second retention members B1, B2 may engage at least one of the connector body counter bore 250 or the outer jacket 115 of the coaxial cable 150. That is, the slots 310 provide for sufficient flexibility of the clamp assembly 105 so that it is sufficiently flexible to enable the outer retention member B1 to snap into counter bore 250 within the connector body 120. Further, the slots 310 should be large enough to prevent interference between first and second arcuate segments 305*a*, 305*b* during connector installation.

As discussed in the preceding paragraphs, the inwardly and outwardly projecting retention members B1, B2 may alternate from one quadrant to an adjacent quadrant, or from a first portion of the clamp assembly circumference to another portion of the clamp assembly circumference. It should be appreciated that additional slots may be added to divide the clamp assembly 105 into more than four alternating segments. For example, six (6) slots 310 may divide the clamp assembly 105 into sixty degree (60°) segments and eight (8) slots 310 may divide the clamp assembly 105 into forty-five degree (45°) segments.

When combined, the first and second segments 305*a*, 305*b* may define a common clamp base 315 and the inwardly and outwardly projecting retention members B1, B2 may have an equal radial extent. In the context used herein, the "radial extent" means the dimension that the retention members B1, B2 project radially from the clamp base, i.e., whether the retention members B1, B2 project inwardly or outwardly. When the radial extents are equal, the ratio from one to another inwardly and outwardly projecting retention member is: 1:1. It should be appreciated that variations are contemplated and within the scope of the disclosure.

In the described embodiment, the ratio from one to another inwardly and outwardly projecting retention member is 1.75:1. That is, the radial extent of an inwardly projecting retention member B2 may have a radial extent of 1.75 relative to the outwardly projecting retention member B1.

The clamp assembly 105 may be composed of an unfilled engineering grade thermoplastic, such as Polyetherimide (Ultem 1000), or Polyetherketone, however, it will be appreciated that other materials may be employed. Alternatively, the clamp may be fabricated from a fiber-reinforced, thermoplastic impregnated polymer to provide quasi-isotropic strength properties.

Accordingly, when connector 100 is press fit over the coaxial cable 150, the outer retention members B1 of the arcuate segments 305*a* engage with the connector body to prevent separation. Similarly, the inner retention member B2 of the arcuate segments 305*b* of clamp assembly 105 engage the cable jacket 115 of coaxial cable 150, so as to keep the connector/cable assembly fixed while the connector is compressed by a compression mechanism.

In another embodiment of the disclosure, the first and second arcuate segments 305*a*, 305*b* do not alternate. In this case, the first and second arcuate segments 305*a*, 305*b* may be adjacent to each other. In another embodiment, there may be only one arcuate segment that has outer and inner barbs or retention members B1, B2 on the same arcuate segment.

It should be understood that various changes and modifications to the embodiments described herein will be apparent to those skilled in the art. Such changes and modifications can be made without departing from the spirit and scope of the present disclosure and without diminishing its intended advantages. It is, therefore, intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A connector for use in combination with a coaxial cable, comprising:

a connector body having an aperture for accepting the coaxial cable, the coaxial cable having an inner conductor, an outer conductor circumscribing the inner conductor and a dielectric core disposed therebetween, and a clamp assembly comprising:

a first arcuate segment; and a second arcuate segment structured to connect to the first arcuate segment so as to circumscribe a terminal end of the coaxial cable and further includes a first end configured to urge the outer conductor into electrical contact with the connector body, the clamp assembly having a second end defining a plurality of retention members projecting radially from each of the first and second arcuate segments, wherein the plurality of retention members comprise first retention members projecting radially outward to engage an inner surface of the connector body and wherein the plurality of retention members comprise second retentions members projecting radially inward to engage an outer surface of the coaxial cable, wherein each of the first and second arcuate segments include a plurality of slots to define a plurality of flexible arcuate segments, wherein the first retention members and the second retention members alternate from one of the plurality of flexible arcuate segments to another of the plurality of flexible arcuate segments, wherein the plurality of retention members inhibit separation of the connector body relative to the coaxial cable.

2. The connector of claim 1, wherein the first end of the clamp assembly defines a common clamp base and wherein the second end of the clamp assembly is slotted to reduce a radial stiffness thereof facilitating radial displacement of the plurality of retention members to engage the inner and outer surfaces of the connector body and coaxial cable, respectively.

3. The connector of claim 1, wherein at least one of the plurality of arcuate segments is biased outwardly toward the inner surface of the connector body and at least one of the plurality of arcuate segments is biased inwardly toward the outer surface of the coaxial cable.

4. The connector of claim 1, wherein the connector body includes a counterbore disposed on the inner surface thereof, and wherein at least one of the plurality of retention members is configured to engage the counterbore of the connector body.

5. The connector of claim 1, wherein the coaxial cable includes an outer jacket and wherein at least one of the plurality of retention members is configured to engage the outer jacket of the coaxial cable.

6. The connector of claim 1, wherein each of the plurality of retention members has a radial extent, the radial extent of each of the inward and outward projecting retention members being equal.

7. The connector of claim 1, wherein each of the plurality of retention members has a radial extent, the radial extent of the inward projecting retention members being greater than the outward projecting retention members.

8. The connector of claim 1, wherein the plurality of arcuate segments comprise a plurality of first arcuate segments and a plurality of second arcuate segments, wherein each of the plurality of first arcuate segments has a first radial extent, wherein each of the plurality of second arcuate segments has a second radial extent, and wherein a ratio of the first radial extent to the second radial extent is substantially 1.75:1.

9. The connector of claim 1, wherein the clamp assembly comprises a thermoplastic polymer.

10. The connector of claim 1, wherein the clamp assembly comprises a fiber reinforced thermoplastic impregnated composite.

11. A compression RF connector, comprising:

a connector body having an aperture for accepting a coaxial cable, the coaxial cable having an inner conductor, an outer conductor circumscribing the inner conductor and a dielectric core disposed therebetween, and a clamp member disposed over the outer conductor, the clamp member having a common clamp base, a plurality of first arcuate segments disposed on the common clamp base, and a plurality of second arcuate segments disposed on the common clamp base, wherein each of the plurality of first arcuate segments comprises a first retention member disposed on its outer surface, and wherein each of the plurality of second arcuate segments comprises a second retention member disposed on its inner surface, wherein the first arcuate segments and second arcuate segments are arranged in an alternating fashion such that the first retention members and the second retention members alternate about the clamp member, and wherein the first arcuate segments are radially biased outwardly such that the first retention members engage an inner surface of the connector body and wherein the second segments are radially biased inwardly such that the second retention members engage an outer surface of the coaxial cable.

12. The compression RF connector of claim 11, wherein the plurality of first arcuate segments comprises at least two first arcuate segments, and wherein the plurality of second arcuate segments comprises at least two second arcuate segments.

13. The compression RF connector of claim 12, wherein the connector body has a counterbore disposed on an inner surface, and wherein the the first retention member is configured to engage the counterbore of the connector body.

14. The compression RF connector of claim 12, wherein the second retention member is configured to engage with an outer jacket of the coaxial cable.

15. The compression RF connector of claim 11, wherein the clamp member comprises a plurality of slots defining each of the plurality of first and second arcuate segments.

16. The compression RF connector of claim 11, wherein each of the plurality of first arcuate segments has a first radial extent, wherein each of the plurality of second arcuate segments has a second radial extent, and wherein the first and second radial extents are substantially equal.

17. The compression RF connector of claim 11, wherein each of the plurality of first arcuate segments has a first radial extent, wherein each of the plurality of second arcuate segments has a second radial extent, and wherein a ratio of the first radial extent to the second radial extent is substantially 1.75:1.

18. The compression RF connector of claim 11, wherein the clamp member comprises a thermoplastic polymer.

19. The compression RF connector of claim 11, wherein the clamp member comprises a fiber reinforced thermoplastic impregnated composite.

* * * * *